Feb. 27, 1968 W. H. SCHENCK 3,370,494

SHEAR LINE ASSEMBLY

Filed Jan. 24, 1967 10 Sheets-Sheet 1

INVENTOR
WILLIAM H. SCHENCK

BY Hughes, Rothwell, Mion, Zinn & Macpeak
ATTORNEYS

Feb. 27, 1968 W. H. SCHENCK 3,370,494

SHEAR LINE ASSEMBLY

Filed Jan. 24, 1967 10 Sheets-Sheet 4

FIG. 18
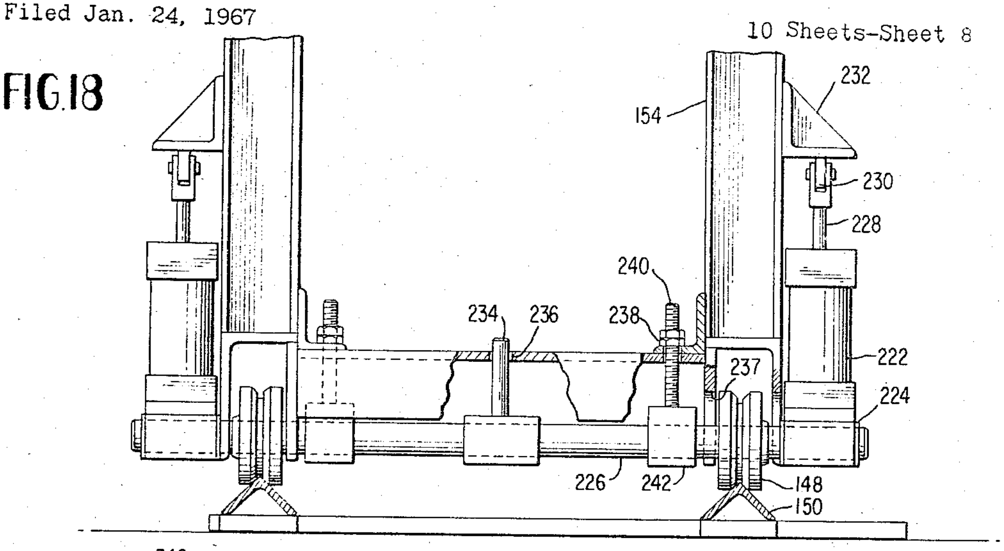
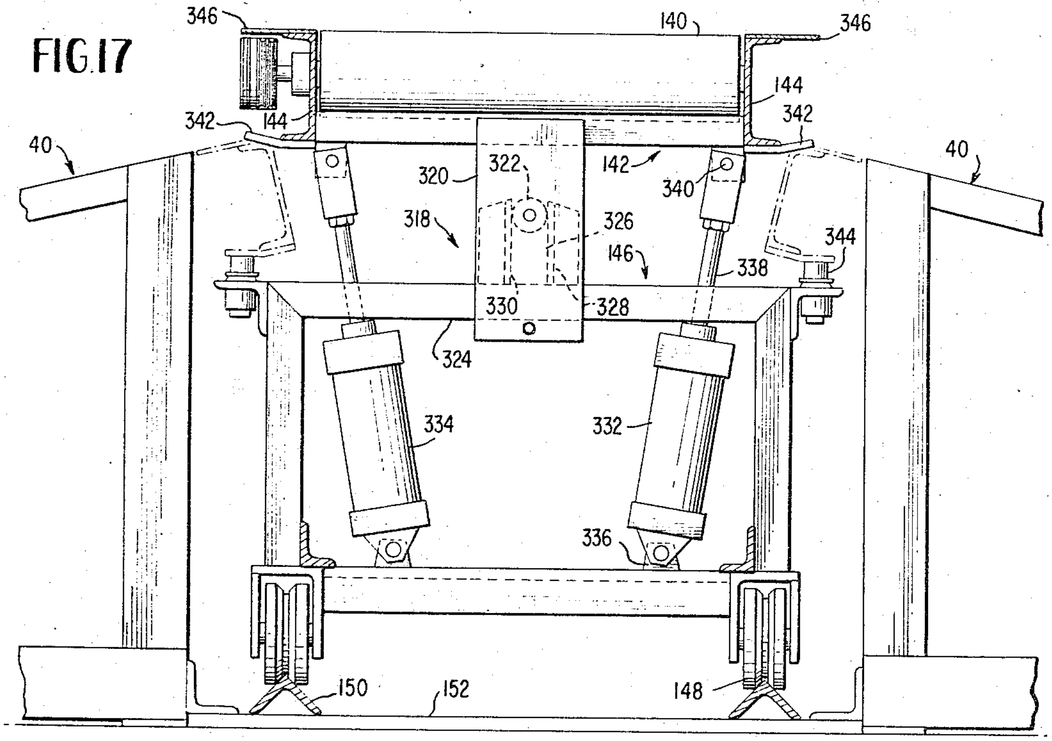
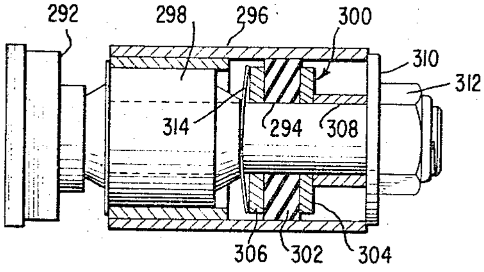
FIG. 16

Feb. 27, 1968 W. H. SCHENCK 3,370,494

SHEAR LINE ASSEMBLY

Filed Jan. 24, 1967

10 Sheets-Sheet 10

United States Patent Office 3,370,494
Patented Feb. 27, 1968

3,370,494
SHEAR LINE ASSEMBLY

William H. Schenck, York, Pa., assignor to Kroy Company, York, Pa., a partnership
Filed Jan. 24, 1967, Ser. No. 611,412
8 Claims. (Cl. 83—155)

ABSTRACT OF THE DISCLOSURE

A shear line assembly is for handling metal stock for shearing and includes a stock rack positioned alongside an elongated feed table, the feed table having conveyer rolls and a preloader mechanism protecting the conveyer rolls when loading metal stock thereon. An elongated discharge table is on the other side of the shear with discharge bins alongside the table. Spaced stop gauges are carried by the discharge table and are selectively movable into position to stop metal stock for shearing predetermined lengths of the stock. The entire discharge table is longitudinally adjustable to finely position any selected stop gauge. The discharge table is tiltable about a longitudinal axis to either one or both sides and includes a discharge assistant mechanism further assisting discharge of the metal stock from the side of the table. The front section of the discharge table is hinged to drop from a transverse pivot upon actuation of the shear and a hold-down is positioned above the hinged section.

This invention relates to improvements in shear line assemblies.

Known shear line assemblies are useful for handling metal stock, such as rods, bars or the like, for shearing by a conventional shear. Typically, a shear line assembly would include an elongated feed table having driven conveyer rolls positioned ahead of a shear. A stock rack for elongated metal stock is positioned alongside the feed table. An elongated discharge table is aligned with the feed table on the opposite side of the shear. The discharge table includes a stop gauge for stopping metal fed by the conveyer rolls. The length of the metal between the stop on the discharge table and the shear determines the amount of metal cut from the elongated rod or bar by the shear.

Shear line assemblies of this general type are quite useful in steel warehouses where long rods and bars are stored and are desired to be cut into variable lengths for use by a steel purchaser. One example would be the use of steel bars as reinforcing rods in concrete. A steel warehouse would keep lengths of rods of various gauges and a concrete contractor would want to purchase a certain number of rods of a specified gauge and a specified length. The use of a shear line assembly would enable the steel warehouse to select the desired gauge rod and cut it into the desired length.

The stop gauge used to stop the metal stock being fed past the shear, in previous shear discharge tables, was movable over a relatively large distance for positioning. The time taken for moving and positioning the stop slowed the use of the shear and production of the cut stock. This invention provides a plurality of spaced stop gauges, any one of which can be instantly selected for quick operation. For fine or close positioning, the entire discharge table is longitudinally movable.

The shear line assemblies which handle the elongated metal stock must be extremely rugged and, in order to have an acceptable maintenance free life, must be protected from shocks occasioned by handling the heavy metal bars and shearing the bars. This invention provides such protection means for preventing shock and ultimate destruction of a number of components of the shear table by a number of unique mechanisms.

Elongated metal stock fed from the stock rack onto the feed table conveyer rolls will damage the conveyer rolls after continuous usage. Accordingly, this invention provides a preloader mechanism for protecting the conveyer rolls by gently loading the metal stock thereon. The shear will cause shock to be transmitted to the metal stock cut and this shock will also be transmitted to the discharge table with adverse results in the prior art constructions. This invention, however, provides a hinged front section of the discharge table so that the front section of the discharge table can be dropped and shock will not be transmitted thereto on operation of the shear. Cooperating with the hinged section of the discharge table is a stock hold-down for the metal stock being cut.

The selectively positionable stops of the discharge table, each include a unique shock absorber and the entire table is movable by infinite increments a distance at least equal to the space between stops. The mechanism for moving the entire discharge table is also protected against shock by suitable shock absorbers.

The discharge table tilts about a longitudinal axis to discharge the sheared metal stock off its side into holding bins. If the metal stock is bent or will not roll easily, it can be assisted in its discharge by a unique mechanism of this invention. Also, if it is desired to provide bins for receiving metal stock on both sides of the discharge table, this invention provides a unique arrangement allowing dual tilting of the discharge table; that is, the discharge table can tilt to either side.

Other features of the invention will be pointed out in the following description and claims and illustrated in the accompanying drawings, which disclose, by way of example, the principle of the invention and the best mode which has been contemplated of applying that principle.

In the drawings:

FIGURE 16 is a detail view of a shock absorber shown partially in section.

FIGURE 17 is a transverse sectional view of a modified form of discharge table capable of tilting to discharge to either side.

FIGURE 18 is an end elevation view, partially in section, of the front end of the hinged section of the discharge table showing the mechanism allowing the front end of the table to drop.

*Shear line assembly in general*

Figure 1A:
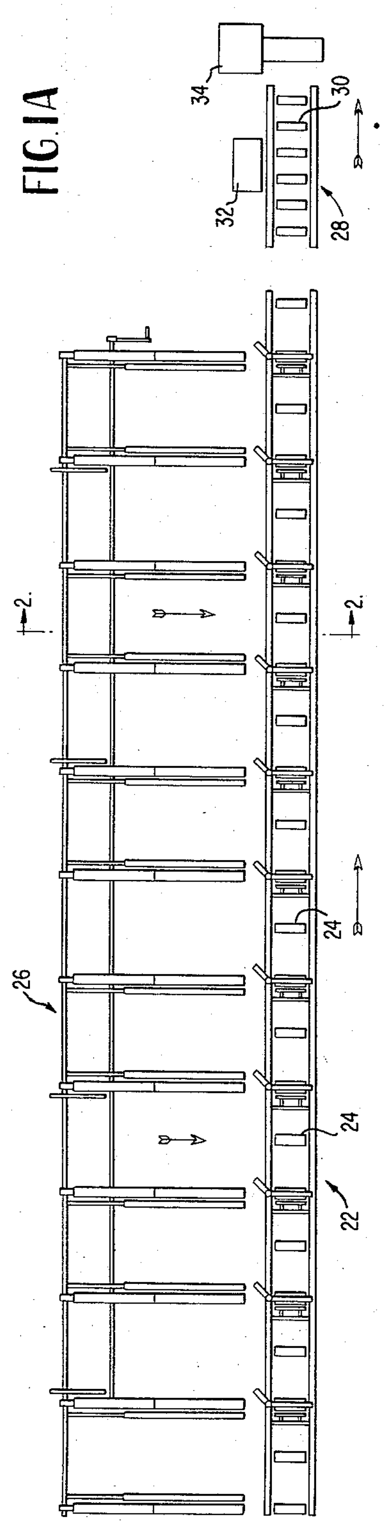
FIGURES 1A and 1B are top plan views of a shear line assembly embodying the improvements this invention.
Figure 1B:
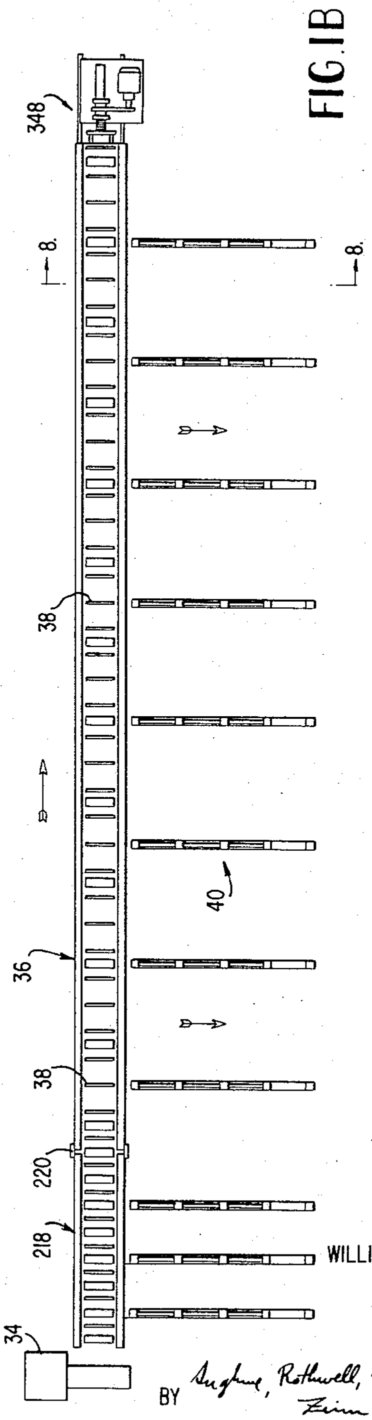

Referring now to the drawings and particularly to FIGURES 1A and 1B, there is shown a setup of a shear line assembly. This shear line assembly includes an elongated feed table 22 having a plurality of power driven conveyer rolls 24 and positioned adjacent a stock rack 26 for supporting elongated metal stock, such as rods and bars of various category sizes and the like, to be sheared.

The feed table conveyer may precede a control station 28 including driven conveyer rolls 30 and a control panel 32. The control panel 32 contains the controls for shearing, for activating the conveyer rolls and stop gauges, and for other mechanisms to be described.

A shear 34 which forms no part of this invention and may be a commercially available shear follows station 28. Stock is fed by the conveyer rolls through open jaws of the shear onto an elongated discharge table 36. The discharge table 36 includes a plurality of spaced stops 38 for stopping the stock at the desired point so that a predetermined length of the stock between the gauge 38 and the shear 34 may be cut. A plurality of discharge bins 40 are provided alongside the discharge table 36 and the discharge table 36 is pivotable about a longitudinal axis to tilt and cause the metal stock to roll off into a preselected one of the discharge bins.

In FIGURES 1A and 1B, movement of the metal stock from the stock rack 26 onto the feed table 22 through the shear 34 onto the discharge table 36 and into the discharge ends 40 is indicated by arrows. Quite obviously, other arrangements of the major components could be utilized. For example, there may be two stock racks 26 on each side of the feed table 22. There may be discharge bins 40 on each side of the discharge table 36. The control section 28 could be incorporated in the feed table, and the entire arrangement could be reversed so that the feed through the shear is from left to right rather than right to left, as viewed in FIGURES 1A and 1B.

*Stock rack*

Figures 2, 3:
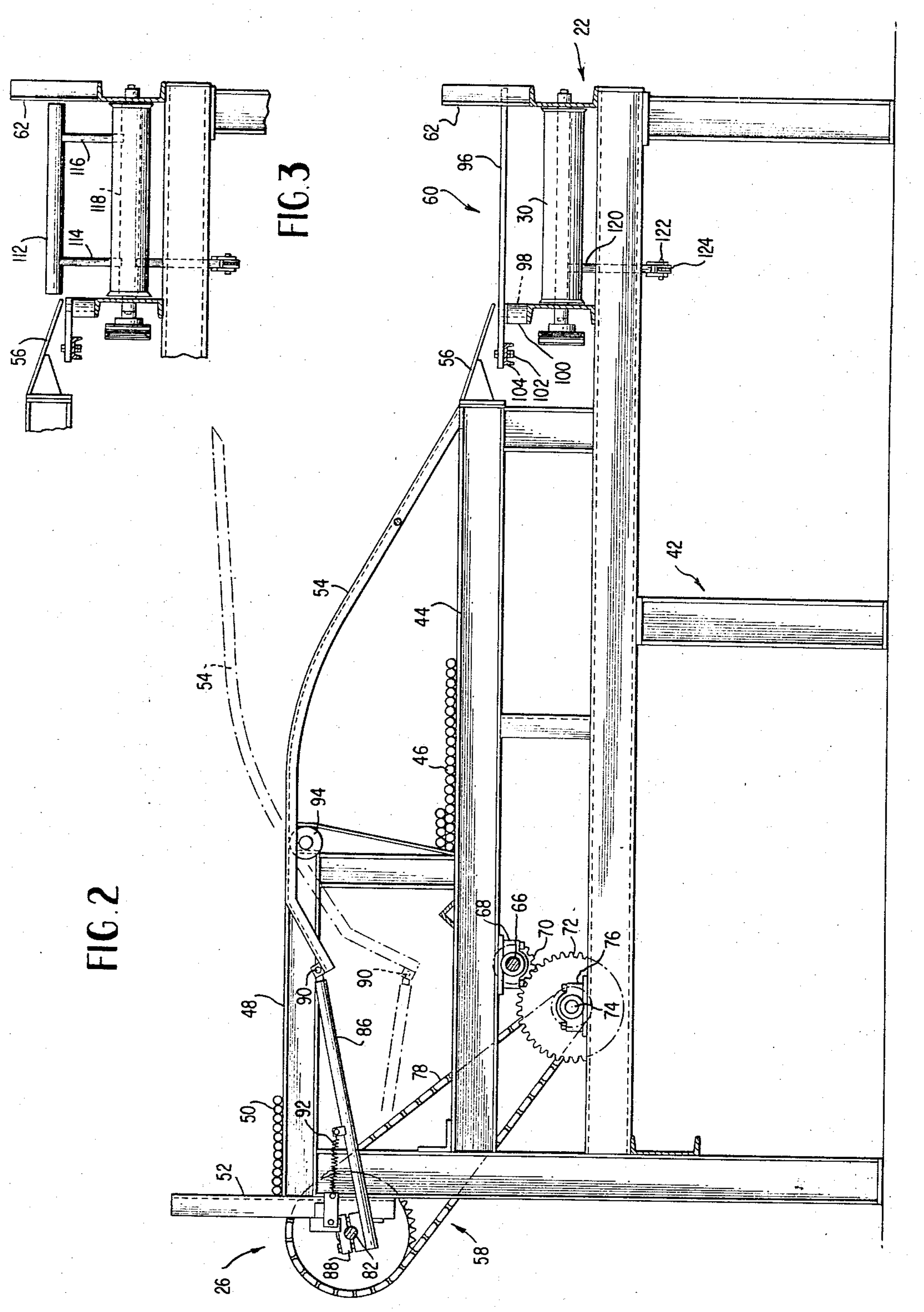
FIGURE 2 is a sectional view taken along line 2—2 of FIGURE 1 illustrating the stock rack and the table.
FIGURE 3 is a sectional view similar to a portion of FIGURE 2 illustrating the operation of the preloader mechanism.
Figure 4:
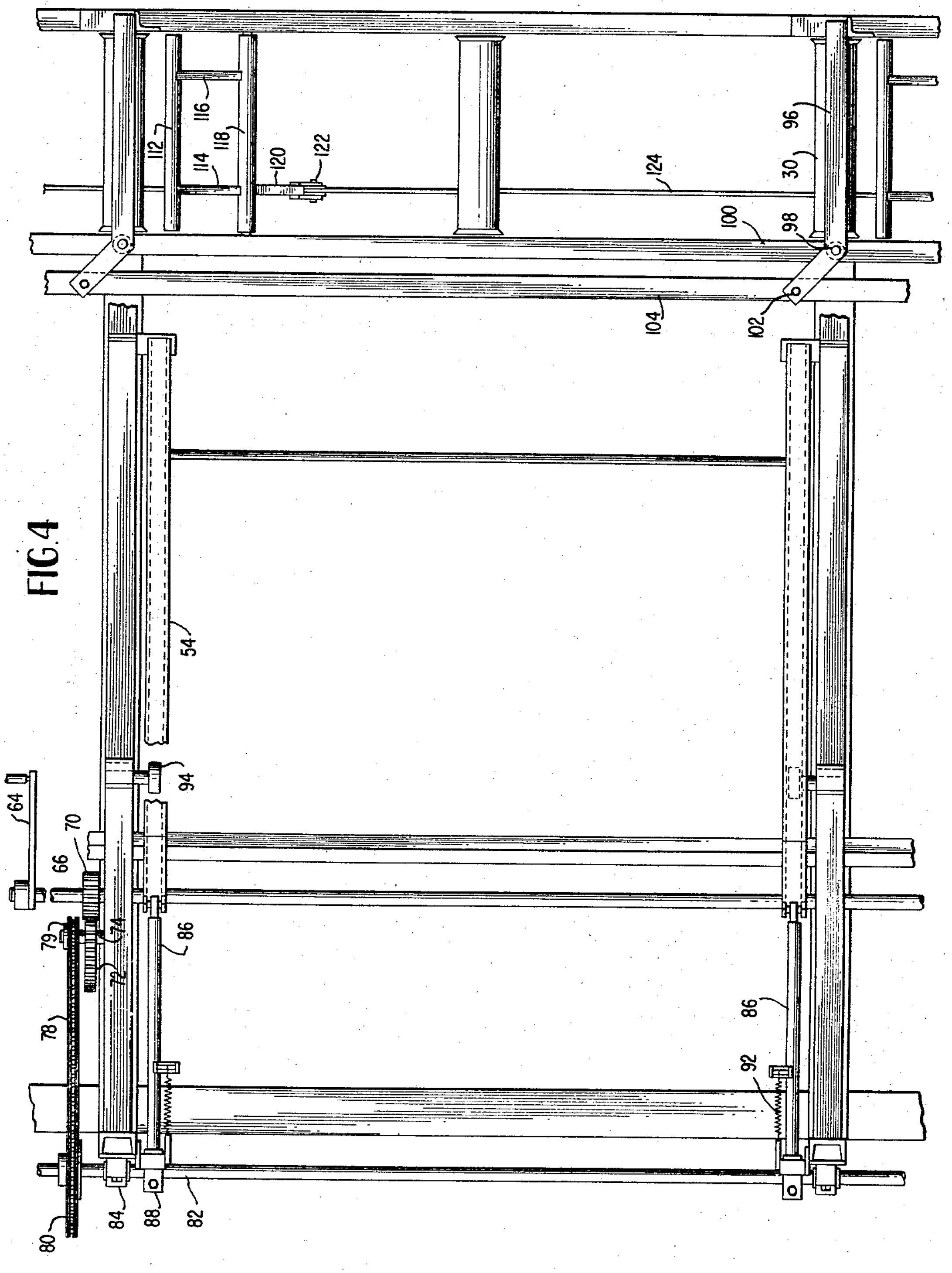
FIGURE 4 is a top plan view of a portion of the stock rack feed table and preloader mechanism illustrated in FIGURE 2.

The stock rack 26 is shown in more detail in FIGURES 2 and 4. The stock rack 26, as well as the feed table 22 are carried by an elongated support framework 42 and the stock rack includes a plurality of spaced horizontal beams 44 on which metal stock bars 46 may be stored. Another series of horizontal support beams 48 may be included in framework 42 above beam 44 and may in turn support another size or gauge of metal stock, such as bars 50. An upright 52 prevents the bars 50 from falling off the back of the stock rack.

An arm 54 extends from the horizontal beams 48 to a feed pan or apron 56 so that bars 50 may be rolled by an operator from the position shown in FIGURE 2 down inclined arms 54 and across apron 56 and onto the feed table 52.

As shown in FIGURE 2, arms 54 are movable from the full line position to a dotted line position at which time metal stock 48 may be removed by an operator and rolled down feed pan 56. An arm actuating mechanism 58 is provided for moving arms 54 to the various positions. As the stock, whether bars 46 or 50 as desired, are slid down pan 56, they are intercepted by a preloader protector mechanism before contacting the top of conveyer rollers 30. A stop 62 is provided to keep the bars from falling off the edge of the feed table 22.

The arm actuating mechanism 58 includes an operating crank 64, FIGURE 4, connected to a drive shaft 66 journalled in bearings 68 and this shaft carries a pinion 70 in mesh with gear 72 on stub shaft 74 journalled in bearing 76. A chain and sprocket drive, including chain 78 and sprockets 79 and 80, is provided to transfer rotation of the crank 64 into rotation of shaft 82 keyed to sprocket 80. Shaft 82 is journalled by bearings 84 from the framework 42. A link 86, FIGURE 2, is clamped by clamp 88 to shaft 82 so that it rotates therewith. A pivotal connection is provided between the other end of link 86 and end of arm 54. Thus, when shaft 82 is rotated by rotating crank 64, link 86 moves from the full line position shown to the dotted line position pulling arm 54 up to the phantom line position shown. A spring 92 connected between the link 86 and framework normally biases the linkage to the full line position shown with the arm 54 down. Movement of arm 54 is over the surface of a roller 94. As shown in FIGURE 4, there are a plurality of arms 54 and links 86 corresponding to the plurality of spaced horizontal beams 44.

*Preloader mechanism*

Figure 5:
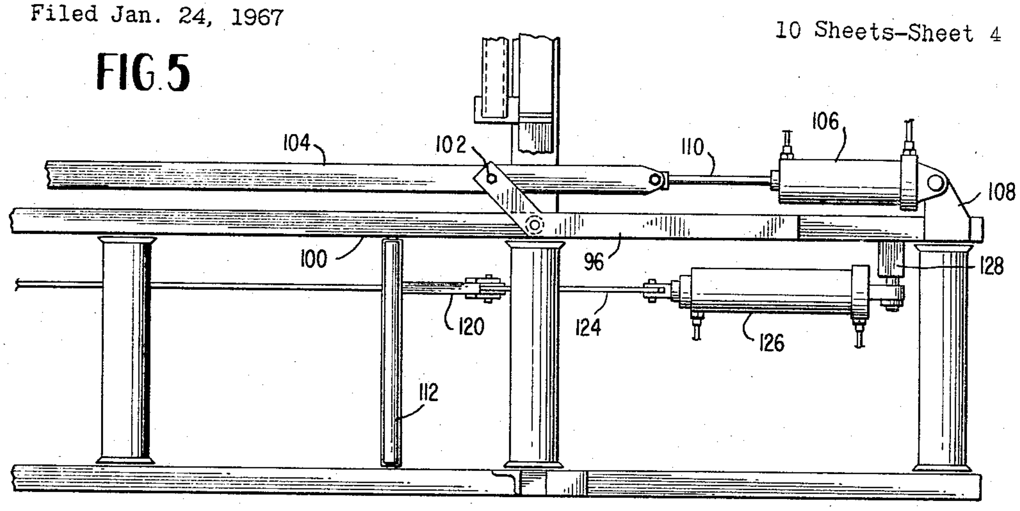
FIGURE 5 is a top plan view of one end of the feed table illustrating the operators for the preloader mechanism.
Figure 6:
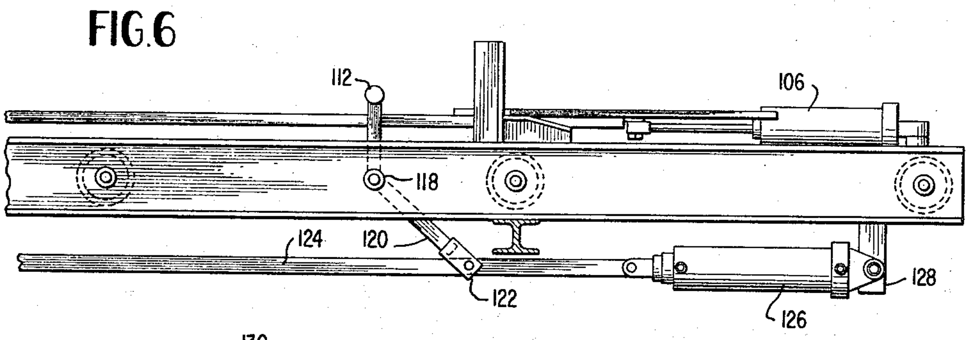
FIGURE 6 is a side elevation view of the end of the feed table shown in FIGURE 5.

A preloader mechanism to protect the conveyer rolls 30 from damage caused by the shock of metal bars 46 and 50 dropping onto the conveyer rolls is show nin FIGURES 2–6. This preloader mechanism 60 includes a plurality of swing arms 96 pivotally mounted by pivot 98 from elongated rail 100. The end of the swing arm is pivotably connected at 102 to a swing arm actuator bar 104. Swing arm actuator bar 104 is longitudinally moved by swing arm power cylinder 106 which is mounted by bracket 108 from framework 42 and has its piston rod 110 connected to actuator bar 104. As can be seen from comparing FIGURES 4 and 5, the longitudinal movement of the actuator bar can move the swing arm into position overlying and at a level above the conveyer rolls 30 or can move the swing arm 90° so that it overlies rail 100 as shown in FIGURE 5. The normal operation of the swing arm 96 is in the position of FIGURE 4 overlying and protecting the conveyer rolls so that when the metal stock, such as bars 46 and 50 are rolled down apron 56, they rest on the protecting swing arm 96.

In order to remove the stock from swing arm 96 and gently lower it onto the driven conveyer rolls 30, there is provided a lift bar 112 connected by struts 114 and 116 to a pivot shaft 118. Extending downwardly from pivot shaft 118 is an arm 120 which is connected by yoke 122 pivotally to a swing arm actuator link 124. As can be seen, there are a plurality of lift bars 112, one for each of the swing arms 96 and each lift bar 112 is movable from a level below the top of conveyer rolls 30 to a higher level above the top of swing arm 96 and then back down below the level of conveyer rolls 30. In this movement, the lift bar 112 lifts the metal stock off the top of swing arm 96, the swing arm 96 is then swung from its stopping position of FIGURE 4 to the position of FIGURE 5, the lift bar 112 is lowered and gently deposits the metal onto the top of the power driven conveyer rolls 30, then the swing arm 96 comes back into its FIGURE 4 position ready to receive more of the metal stock to be cut while the conveyer rolls 30 are actuated from control panel 32 to feed the stock resting on the rolls through the shear 34 and against a selected stop gauge 38.

Actuator link 124 is pivotally connected to the piston rod of lift bar cylinder 126 and the cylinder itself is attached to lug 128 and supported from frame 42. Of course, activation of cylinder 124 causes rotation of pivot shaft 118 and raising or lowering of lift bar 112. Obviously, cylinders 106 and 126 must be actuated in sequence. Cylinder 126 is actuated first to raise the lift bar 112, then cylinder 106 is actuated to swing swing bar 96 out of position, then the cylinder 126 is actuated to lower the lift bar 112 and cylinder 106 is actuated in the opposite direction to move the swing bar 96 back into position. Typical sequencing actuators known in the art are used to control cylinders 106 and 126.

*Modified stock rack*

Figure 7:
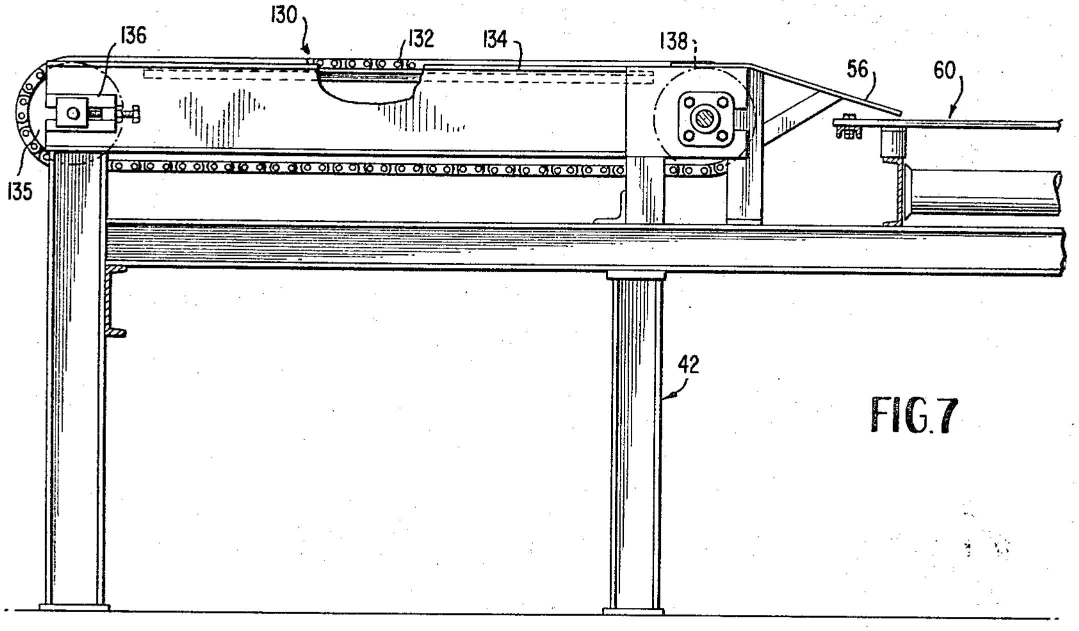
FIGURE 7 is a transverse sectional elevation view similar to FIGURE 2 illustrating a modified form of the rack.

FIGURE 7 shows a modified form of chain stock rack 130. This stock rack may be on one or preferably both sides of the feed table 22 and bar or rod stock is positioned on top of the stock rack. The stock rack is carried by framework 42 and has a series of chains 132 guided in troughs 134 on its upper surface. These chains extend above the trough and furnish support for metal bars resting thereon. Each chain 132 is trained around an idler 135 which may be adjusted by sprocket adjuster 136 and around a drive sprocket 138. The drive sprockets may be connected to a hand crank or motor. To feed stock resting on top of the chain of the stock rack 130, the chain is driven toward the right as viewed in FIGURE 7 so that the stock moves off the chain, slides down feed pan 56 onto the preloader mechanism 60, as described above. A large warehouse using programmed cutting of stock could use the chain feed table 130 of FIGURE 7.

*Tilting discharge table*

Figure 9:
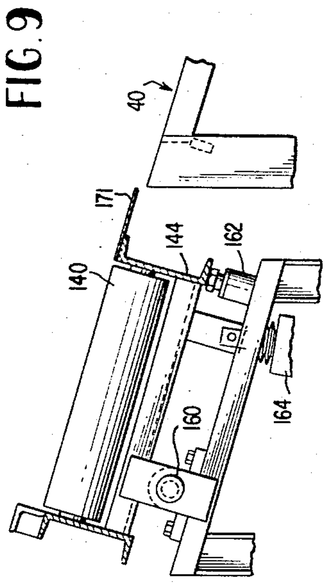
FIGURE 9 is a transverse sectional view similar to a portion of FIGURE 8 illustrating the discharge table in tilted discharge position.
Figure 8:
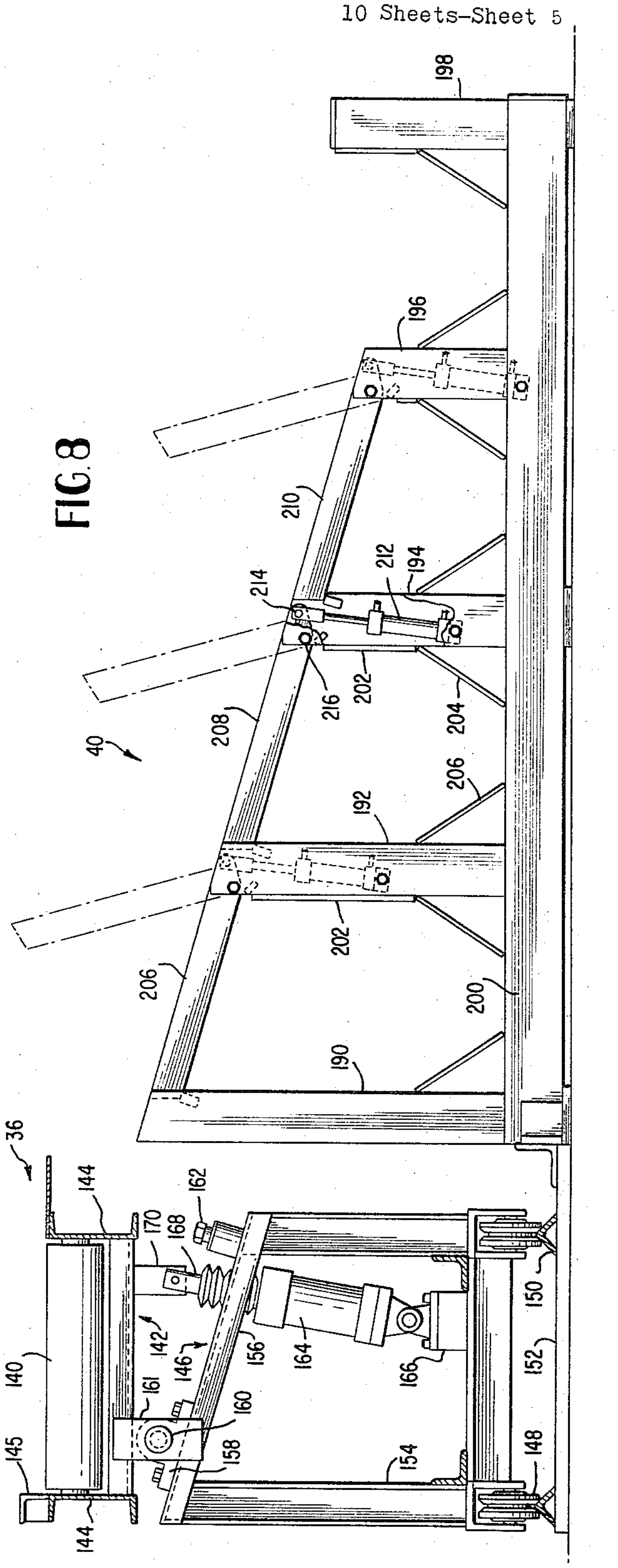
FIGURE 8 is a sectional elevation view taken along line 8—8 of FIGURE 1B showing the discharge table and discharge bins.

The discharge table 36 which tilts about longitudinal axis is shown in more detail in FIGURES 8 and 9. The discharge table 36 includes a plurality of spaced power driven conveyer rolls 140 which are in a top conveyer section 142 of the table. The conveyer rolls are carried by side channels 144 and a stop 145 is provided along one side of the conveyer rolls opposite the discharge bins 40. The discharge table includes a movable truck section 146 below the top conveyer section 142 and the truck section has wheels 148 by which the discharge table 36 is movable along longitudinal rails 150 which are spaced apart by cross ties 152.

The body of truck section 146 includes framework 154 having a top member 156 which is inclined in the FIGURE 8 embodiment. The top 156 carries a bearing block 158 which functions to provide the longitudinal hinge as pivot support for shaft 160 carried by lugs 161 which depend from the top section 142. This pivot allows the conveyer rolls to be tilted to a predetermined angle, for example, 15°, from the horizontal position of FIGURE 8 to the discharge position of FIGURE 9. The amount of tilt is controlled by an adjustable stop 162 extending upwardly from truck frame top 156 and is under the control of a tilt control cylinder 164 which is secured to the frame through a support block 166. The cylinder 164 has a bellows protected piston rod 168 which is secured pivotally to a depending lug 170 attached to the top conveyer section 142. Thus, when the piston is extended in cylinder 164, the top of conveyer rolls 140 is level for the feed and shearing, while after the stock has been sheared, the piston is retracted so that the conveyer rolls are tilted dumping any severed bar stock thereon into the discharge bin assembly 40, see FIGURES 8 and 9. An apron 171 prevents the bars from falling before they go onto the discharge bin assembly 40.

*Discharge assistant*

Figure 10:
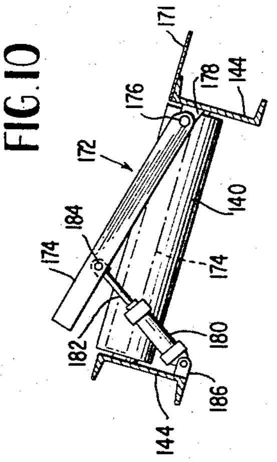
FIGURE 10 is a transverse sectional view similar to FIGURE 9 illustrating a discharge assistant used with the discharge table.

FIGURE 10 illustrates a discharge assisting mechanism 172 to further raise the angle of tilt and thus assist in discharging the bars or rods from the side of the conveyer. This discharge assisting mechanism includes a discharge arm 174 pivotally mounted 176 to a lug 178 extending inwardly from channel 144. A power discharge cylinder 180 includes a piston rod 182 pivotally connected to arm 174 at pivot 184 and connected to lug 186 of the opposite channel 144. At the time the conveyer rolls 70 are horizontal as in FIGURE 8, the discharge assistant would be in the phantom line position of FIGURE 10. When, however, the top of the conveyer roll 140 is tilted, as in FIGURE 9, and the metal stock thereon does not go into the discharge bin assembly 40, then cylinder 180 is activated to provide an additional 15° or so of tilt to further nudge the metal stock to slide off the conveyer rolls onto apron 171 and into the discharge bin assembly 40.

*Discharge bin assembly*

The discharge bin assembly 40 is shown in FIGURE 8. As can be seen from FIGURE 1, there are a plurality of identical units similar to that shown in elevation in FIGURE 8. These units include a near upright 180 followed by intermediate uprights 192, 194 and 196 and an outer upright 198 all secured to a base beam 200. The entire assembly is positioned beside the discharge conveyer 36 and tied to ties 152. The uprights define between them discharge bins. Each of the discharge bins has a wear plate 202 on its outer surface and stacking assist plates 204 and 206 inclined towards its bottom surface. The uprights have a height so that when the tops of all the bins are covered, an inclined surface is provided. The bins are adapted to be selectively covered or bridged by bridging arms 206, 208 and 210. These arms have two positions, a full line position and a phantom line position, as shown in FIGURE 8. Each of the arms is identical and they may be actuated to either full or phantom line position by means of a bridge arm actuating cylinder 212 connected to an outer portion of the arm by pivot 214 and the arm itself is pivoted to the upright by pin 216. With the arms in the full line position, the metal stock cut will pass over the top of the bins into the outermost pocket. With any one of the arms upright, the metal stock cut will pass into the bin closest to the discharge conveyer having its arm upright. The control of the bridging arms by the bridging arm power cylinders 212 is from the control panel 32.

*Hinged front section of discharge table*

Figures 11, 12:
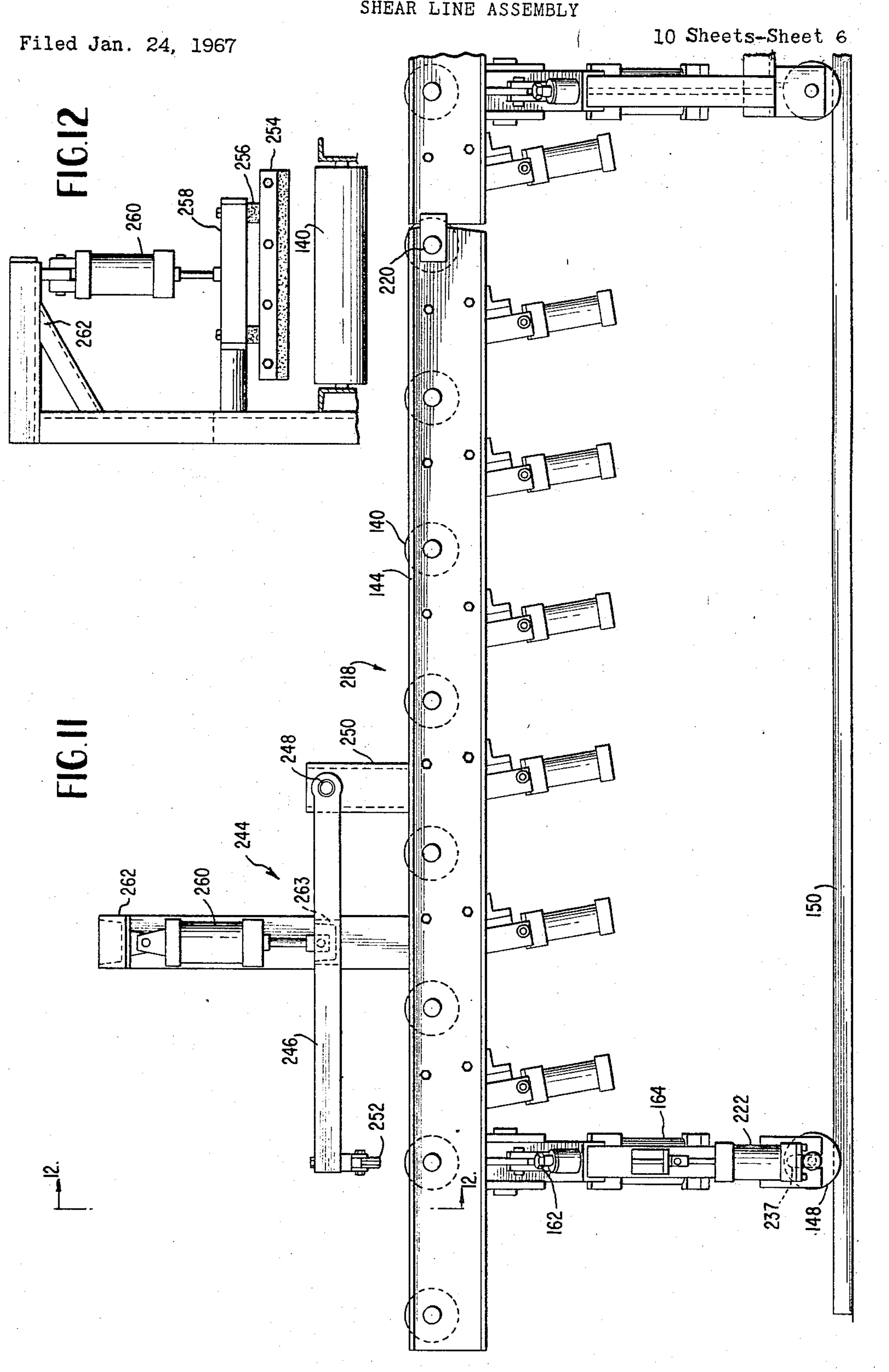
FIGURE 11 is a side elevation view of the front hinged section of the discharge table.
FIGURE 12 is a sectional elevation view taken along line 12—12 of FIGURE 11 showing an elevation of the hold-down mechanism.

The discharge table 32 includes a front hinged section 218, see FIGURES 1B and 11. This front section, which may be the first seven feet of the discharge table following the shear 34, is pivotally connected by pivots 220 on both sides of the discharge table. The arrangement and assembly allowing the front portion of section 218 to pivot downwardly about transverse axis 220 is shown in FIGURES 11 and 18.

The front section is normally held horizontal with the remaining portion of the table by hinge section support cylinders 222. As shown in FIGURE 18, there are two cylinders although one may be used. Cylinder 222 is journalled by journal 224 onto axle 226 for the wheels 148. A piston rod 228 of cylinder 222 is connected by yoke 230 to a bracket 232 rigid with the framework 154. A center guide 254 extends through a hole 236 in the bottom portion of the framework to guide the framework for vertical movement. The bottom of the side posts for the framework includes slots 237 to allow the framework to have vertical movement with regard to the axle 226. The horizontal level of the front section is determined by stop nuts 238 on screw 240 extending upwardly from a collar 242 around axle 226. The lower position of the table when piston rod 228 is retracted is determined, of course, by the length of the slots 237.

The framework 154 also includes the tilting mechanism described in connection with FIGURE 8, including tilt cylinder 174 and stop 162. The cylinders 222 are activated at the time the shear cuts the metal stock so that the front hinged section 218 does not support the metal stock at the time of shearing and shock transmitted to the metal stock is not transmitted to this portion of the discharge table. Immediately after the shear, however, piston 222 brings the hinged portion up level and then the entire discharge table is tilted to discharge the stock into any selected bin.

*Hold-down assembly*

Figure 13:
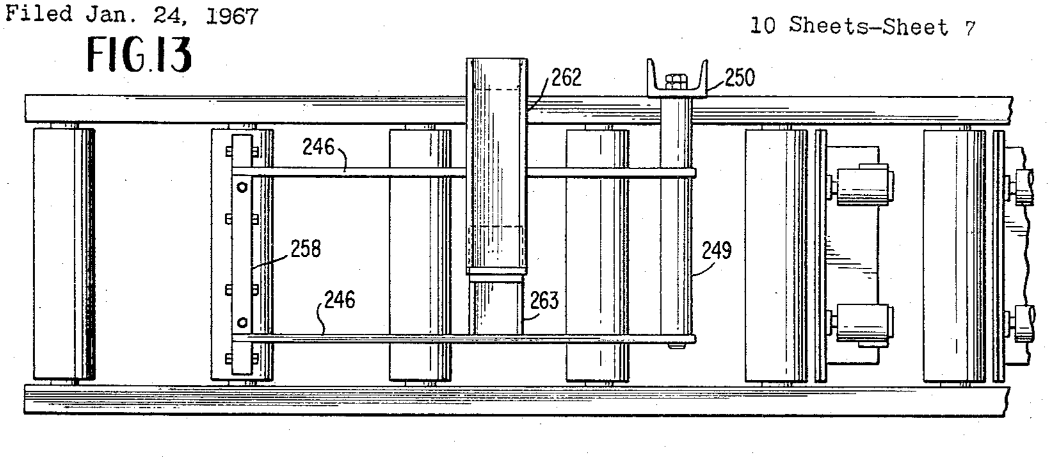
FIGURE 13 is a top plan view of the portion of the hold-down mechanism shown in FIGURE 12.

A hold-down assembly 244 is shown in FIGURES 11, 12 and 13. This hold-down assembly is actuated at the same time the shear blades are actuated to hold down the metal stock being sheared and prevented from splattering. The shear itself includes an entrance end hold-down, but the hold-down assembly 244 does not actually hold the metal stock rigidly between it and the top of conveyer rolls 140 of the hinged section 218 since the hinged section 218 is dropped at the same time the hold-down assembly comes down and this simultaneous with the operation of the shear.

The hold-down assembly includes a pair of hold-down arms 246 pivotally connected at 248 to a bar 249 which is carried by upright 250. A hold-down pad of rubber 252 is clamped by clamp 254 and secured by rubber pads 256 to a front bar 258 at the end of the hold-down arms 246.

A hold-down actuating cylinder 260 is supported from rigid bridge 262 and actuates the arms 246 to move about their pivot points by having its piston rod connected to a crossbar 263. Movement of the piston rod of cylinder 260 downwardly causes movement of the hold-down pad 252 downwardly to hold down metal stock at the time of cutting and prevent it from splattering upwardly and possibly injuring an operator or bystanders.

*Stop gauges*

Figures 14, 15:
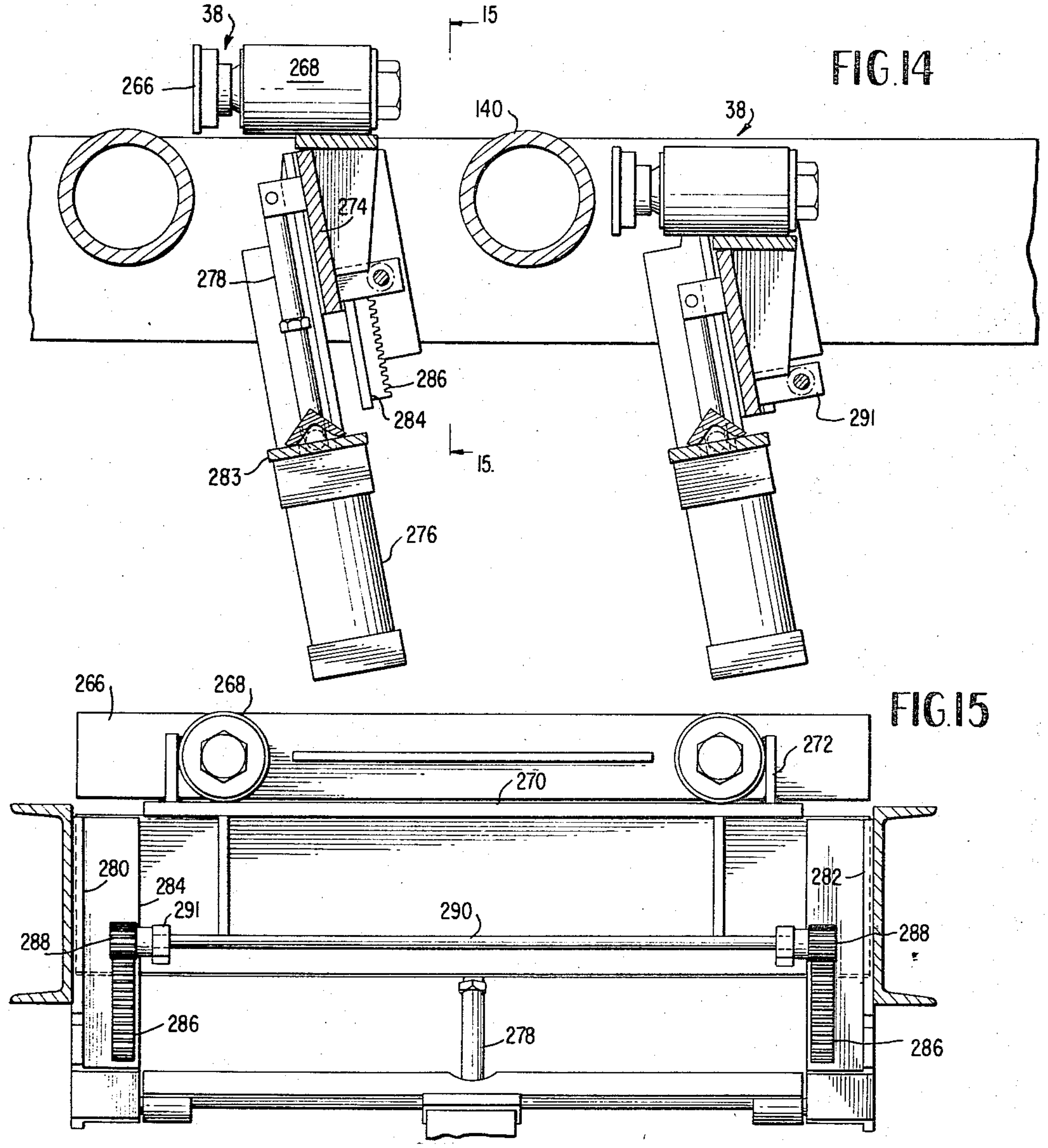
FIGURE 14 is a detailed side elevation view, partially in section, showing the stop gauges carried by the discharge table and selectively movable into position to stop metal stock.
FIGURE 15 is a detailed view looking along line 15—15 of FIGURE 14.

As explained with reference to FIGURE 1, there are a plurality of selectively positionable stop gauges 38. Two of these gauges are shown in FIGURE 14 and further details of the gauge assembly are shown in FIGURE 15.

The stop gauges includes a stop bar 266 which extends across the width of the discharge table and is movable from a level below the surface of conveyer rolls 140, as shown in the right-hand side of FIGURE 14 to a level just above the top of conveyer rolls 140 shown in the left-hand side of FIGURE 14 to stop metal being fed by the conveyer rolls so that a predetermined length of metal between the raised stop gauge and the shear may be cut.

Behind the stop bar 266 are a pair of shock absorbers 268. These shock absorbers have their housing supported on a carriage including a crossbar 270 and uprights 272. The carriage includes a depending portion 274 which is actuatable by air cylinder 276 connected thereto by piston rod 278. The carriage is guided by side channel guides 280 and 282 to partake of the vertical sliding movement while the cylinder 276 is secured to a stationary frame portion 283.

Side plates 284 carry racks 286 for cooperation with pinions 288 on shaft 290. The shaft is rotatably attached by brackets 291 to the carriage. This rack and pinion also assure guided movement of the individual stops 38.

*Shock absorber*

The individual shock absorbers 268 include a plunger portion 292 having a plunger shaft 294 and movable to a limited extent within a housing 296. As noted with respect to FIGURES 14 and 15, the housing 296 is stationary. A bonded rubber tube mounting 298 functions as a shock absorbing mounting and a rebound prevention assembly 300 constitutes the unique improvement of this particular shock absorber, as shown in FIGURE 16.

The rebound prevention assembly includes an annular rubber washer 302 which is slidable on shaft 294 and within housing 296. This washer is sandwiched between rigid metal washers 304 and 306 and washer 304 is spaced from the end of plunger shaft 294 by a bushing 308, collar 310 and nut 312. A one-way spring washer, such as a Belleville washer 314, is provided between the bonded rubber tube 298 and washer 306.

In operation, the rebound prevention assembly snubs the plunger shaft to prevent rebound. When metal traveling at a fast rate hits the stop gauge, it causes the plunger shaft 294 to move to the right. This movement is restrained resiliently by the bonded rubber tube 298. During movement to the right by plunger shaft 294, the washer 302 and the metal washers 304, 306 also move with the plunger shaft, while the washer 302 slides loosely within the housing 296. At the end of the stroke to the right, the plunger shaft 294 will tend to rebound to the left as viewed in FIGURE 16. At this time, however, washer 314 is no longer flattened by the bonded rubber tube 298 and assumes its curved shape, as shown in FIGURE 16. This shape causes the washer 314 to grip the shaft 298, and stops washer 306 from sliding on the shaft 294. Thus, rebound of the shaft 294 causes washer 304 to compress the annular rubber member 302. Compression of the member 302 causes it to expand radially, frictionally gripping the inside of stationary housing 296. This frictional gripping of housing 296 snubs and slows down any rebound of the plunger 292.

*Dual tilt discharge table*

FIGURE 17 illustrates a dual tilt discharge table having a longitudinal pivot assembly 318 in the center portion thereof so that the table may tilt to either side, as shown in phantom lines in FIGURE 17 to discharge into either one of the discharge bin assemblies 40 on either side of the discharge table. The discharge table includes an upper conveyor section 142 with the driven conveyer rolls 140 carried between opposed channels 144. It also includes a lower movable truck section 146 having wheels 148 movable on tracks 150 connected by cross ties 152.

The pivot assembly 318 includes a pivot formed by depending plates 320 extending downwardly from top conveyer section 142 carrying between them a pivot bar 322. The pivot bar is guided for vertical and rotational movement in a guide slot 326 formed by guide plates 328 and 330 extending upwardly and secured to top 324 of the truck section 146.

Tilting to either side is under the control of tilt cylinders 332 and 334 connected to the truck section by lugs 336 and having their piston rods 338 connected to opposite sides of the top conveyer section 142 by pivot yokes 340.

When one of the piston rods 338 is extended and the other is retracted, the top section 142 will pivot to either of the phantom line positions shown, at which time stop 342, secured to the bottom of channel 144, will contact adjustable stop 344 secured to the truck frame. A tray extension or apron 346 is provided on both sides of channels 144 so that the metal bars will not drop prior to reaching the bin assemblies 40.

*Discharge table fine adjusting assembly*

Figure 19:
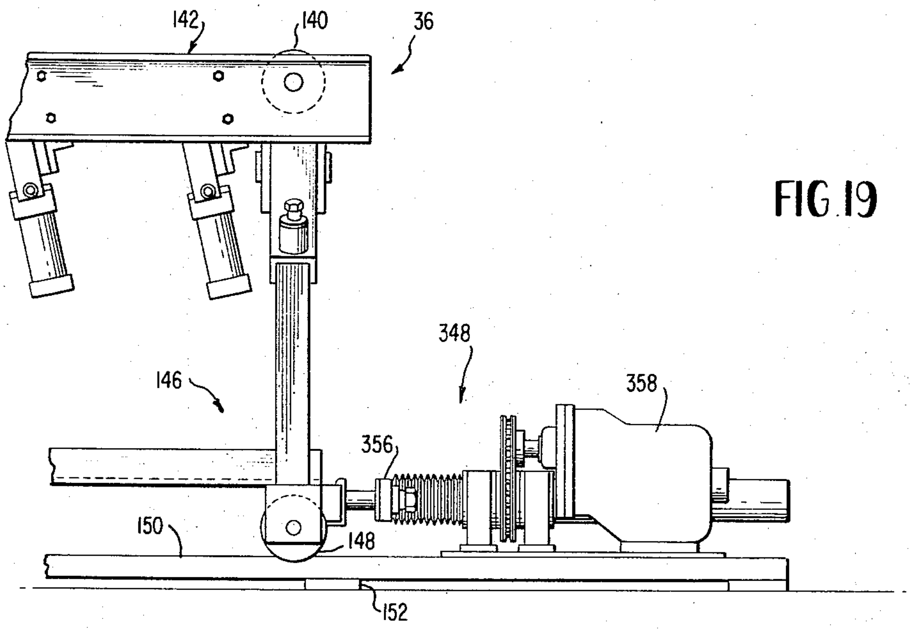
FIGURE 19 is a side elevation view of the end of the discharge table illustrating the mechanism for moving the entire table.
Figure 20:
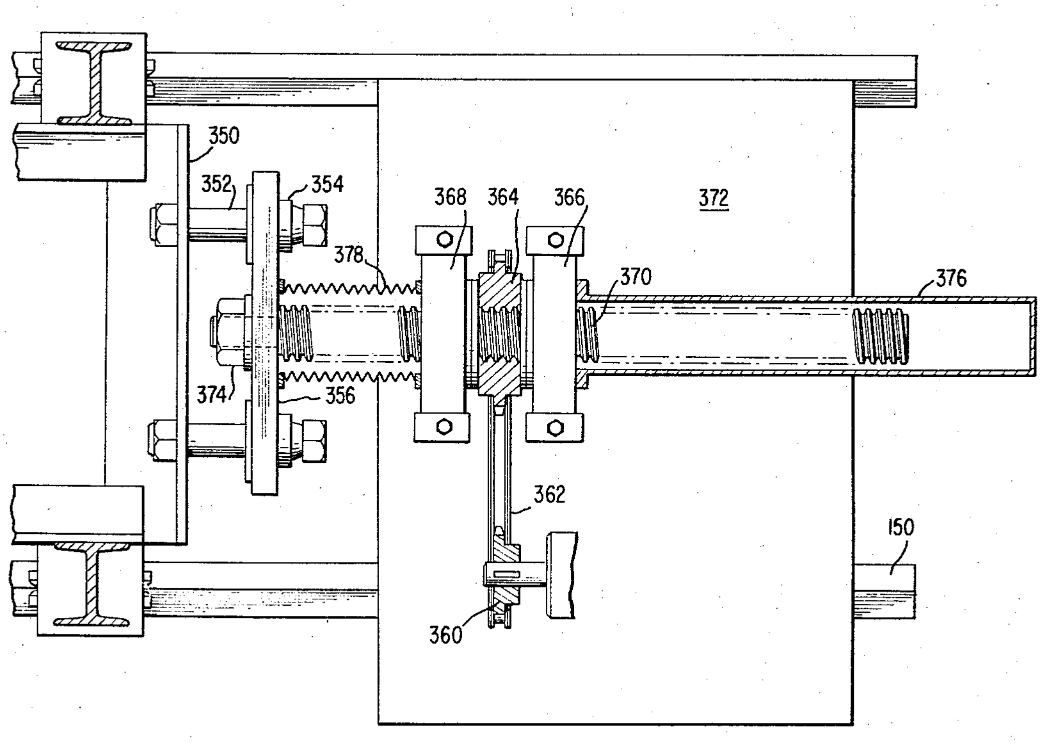
FIGURE 20 is a top plan view of the mechanism for moving the discharge table shown in FIGURE 19 with portions shown in section for the sake of clarity.

The discharge table 36 has spaced stops 38 which extend upwardly therefrom to gauge the length of metal cut within even increments, for example, even feet are further positioned for an infinitely fine adjustment, by moving the entire discharge table 36. This movement is accomplished by having truck section 146 of the discharge table connected to a fine adjustment mechanism 348, see FIGURES 1, 19 and 20.

The fine adjusting mechanism 348 includes a cross plate 350 secured to the truck 146. The plate 350 has bolts 352 extending rearwardly therefrom and connecting through the intermediary of tube form mounted shock absorbers 354 to a drive bar 356. The shock that the discharge table 36 receives when the stock hits a selected stop gauge is transmitted to the tube formed shock absorbers 354 and absorbed primarily therein rather than being transmitted to the drive mechanism for the drive bar 356.

This drive mechanism includes a motor transmission unit 358 driving a sprocket 360 around which a drive chain 362 is trained and this chain extends further around a sprocket and internal nut 364. Bearings 366 and 368 rotatably support a drive screw 370 from a rigid support plate 372 and sandwich the sprocket nut 364 between them. The drive screw 370 is secured to the drive bar 356 by a nut 374 and is protected by bellows 378 and tube 376.

As can be seen, on rotation of the motor 358 and rotation of the sprocket nut 364, the nut will turn, but since the nut cannot move axially, the screw 370 will move axially, thus moving the truck section 146 and the entire discharge table. The motor 358 may be reversible and preferably the assembly is movable six inches in each direction within the one foot increment of space between stop gauges. The control for fine positioning is from the control panel 32 and an indicator showing the actual position of the discharge table 36 is provided by a pointer at panel 32 connected by flexible cable to the discharge table.

*Control panel*

Figure 21:
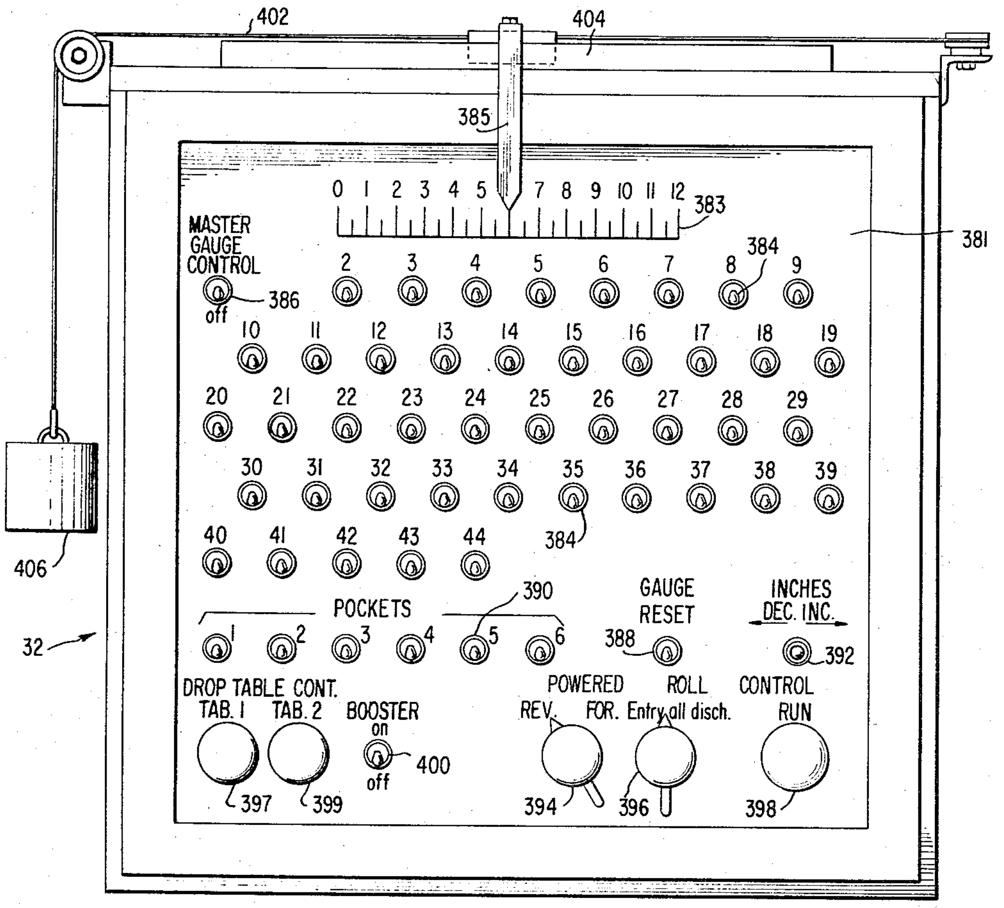
FIGURE 21 is a front elevation of the control panel.
Figure 22:
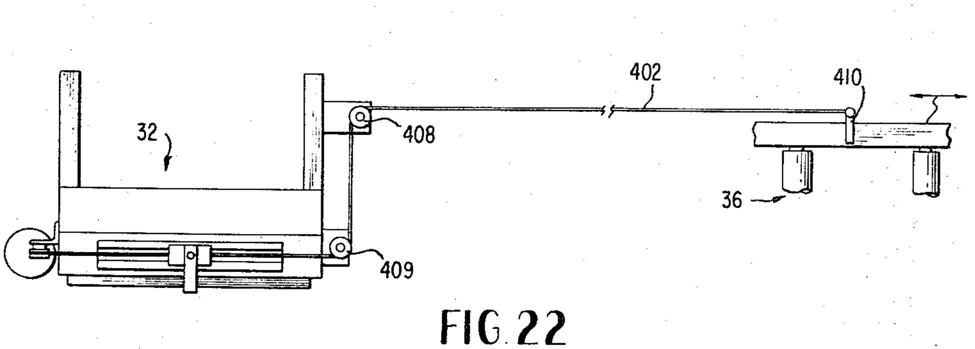
FIGURE 22 is a top plan schematic view of the control panel and its connection for measurement purposes to the discharge table.

The control panel 32 as shown in FIGURE 1A is shown in more detail in FIGURES 21 and 22. Although the control panel is shown in plan view of FIGURE 1A as off to the side of the line of conveyers, this is merely for the sake of clarity as the control panel is actually immediately above the control section 28 of the shear line assembly.

As can be seen from FIGURE 21, the control panel face includes a face 381 with a scale 383 over which an indicator arm 385 moves to indicate the inches that the discharge table is moved. The stop gauges are spaced one foot apart and the indicator covers the inches between this foot apart spacing. Each of the stop gauges 38 is controlled by an individual switch, such as switch 384. There is a master on-off control switch 386 for all of the stop gauges and a reset gauge button 388 to reset a stop gauge after a cutting operation. Because metal sheared will tend to "grow" when cut, the particular stop gauge which stops the metal being cut is dropped at the time the shear is actuated so that the metal will not wedge itself between the stop and the shear. To cut the metal stock of the same length next time, all that has to be done is to push the reset and the same stop gauge will move upward.

The various bins 40 are controlled by the pocket switches 390, there being one pocket switch for each bin. The drive of motor 358 for moving the discharge table can be either in a forward or reverse direction and is controlled by switch 392.

The power conveyer rolls 30 and 40 are controlled by switches 394, 396 and 398 which cause the conveyer to run in either a forward or reverse direction at either the entrance or discharge table conveyer.

The discharge assistant of FIGURE 10 is controlled by booster switch 400. The discharge table is tilted about its longitudinal axis under the control of buttons 397, 399.

The pointer 385 is connected to a cable 402 and is movable in guide 404. A weight 405 attached to cable 402 biases the pointer to the left as shown in the drawings. The cable 402 passes over pulleys 408, 409 and is connected to a post rigidly secured to the discharge table 36. Thus, movement of the discharge table by the motor 358 to finally position the discharge table, will be transmitted in a 1:1 ratio directly to the pointer 385.

*Operation*

It is believed that the operation is apparent from the foregoing detailed description. However, a brief résumé will now be given.

Metal stock in the form of bars or rods is loaded into the stock rack. The stock rack may be of the type shown in FIGURE 2 or may be of the type shown in FIGURE 7. If the stock rack is of the type shown in FIGURE 7, chain 132 will feed the bars onto the preloader mechanism 60.

The preloader mechanism may then lower one bar or bars from the swing arm 96 by means of lift bar 112 onto the driven conveyor rolls 30. The sequence is that lift bar 112 is actuated by cylinder 126 to raise up above the level of rolls 30, swing arm 96 is swung about its pivot by cylinder 106, lift bar 112 comes back down to deposit the metal bars and rods on the conveyer rolls 30 and swing arm 96 swings back over the top of the conveyer rolls. The operator at control 32 causes the rolls to drive the bars to be cut through open jaws of a commerically available shear 34 along the discharge table 36 until they abut against the selected stop gauge 38. The operator has chosen the stop gauge 38 and power cylinder 276 moves it upwardly above the level of discharge conveyor rolls 130 as shown in FIGURE 14. The operator also energizes the reversible motor 358 to position the entire discharge table at any increment of position within the distance between stop gauges 38. The operator further selects the bin of the bin assembly 40 into which the cut stock is to be discharged by causing selective activation of cylinders 212 controlling bridging arms 206, 208 and 210.

The shear is then operated and the time the shear is shearing the stock causing a considerable shock to be imparted thereto the front hinged section 218 of the discharge table pivots downwardly about pivot 220 under the control of cylinders 222 so it does not bear this shock. At the same time, hold-down assembly 244, FIGURE 11, is actuated so that rubber pads 252 touch the top of the stock being sheared and prevented from splattering.

After the stock is cut, the entire discharge table is tilted about its longitudinal pivot, for example, by moving from the FIGURE 8 to the FIGURE 9 position under the control of cylinder 164. The bars can further be discharged by the discharge assistant 172 of FIGURE 10 and they roll off of apron 171 onto the discharge bin assembly 40 and into the selected bin. The discharge table 36 is then returned to its horizontal position by extending piston rod or cylinder 164 and the operator is ready to cut the next length of stock by repeating the above operations. The discharge table could be a dual sided discharge table as shown in FIGURE 17. Additionally, the large shocks transmitted to the discharge table by the fast moving stock hitting the gauges is absorbed by the unique arrangement of the shock absorbers 268 shown in FIGURE 16 as part of the gauges and by the shock absorbers 354 between the movable truck section 146 of the discharge table and the fine adjustment mechanism 348.

While the invention has been particularly shown and described with reference to preferred embodiments thereof, it will be understood by those skilled in the art that various changes in form and details may be made therein without departing from the spirit and scope of the invention.

What is claimed is:

1. A shear line assembly for handling metal stock for shearing by a shear, the assembly comprising; an elongated feed table including driven conveyer rolls positioned ahead of a shear, a stock rack for elongated metal stock positioned alongside the feed table, an elongated discharge table aligned with the feed table and on the opposite side of the shear from the feed table, the discharge table including a plurality of selectively positionable spaced stop gauges for stopping metal being fed by the conveyer rolls to determine the length of metal cut by the shear, means mounting the discharge table for longitudinal movement, and means for driving and positioning the discharge table longitudinally within a range of distance equal to at least the distance between the spaced stops.

2. In a shear line assembly for handling sheet metal stock for shearing by a shear, the assembly including an elongated feed table having driven conveyer rolls positioned ahead of the shear, a stock rack for elongated metal stock positioned alongside the feed table, an elongated discharge table aligned with the feed table and on the opposite side of the shear from the feed table, the discharge table including stop means for stopping metal being fed by the conveyer rolls to determine the length of metal cut by the shear, the improvements comprising; protecting means for protecting the conveyer rolls of the feed table from shock of metal stock moved from the stock rack to the feed table, the protecting means including a preloader assembly, the preloader assembly comprising a protecting arm selectively positionable above the level of the conveyer rolls, and a let-down bar for lifting the stock above the level of the arm and then lowering the stock to a level where it rests on the conveyer rolls, the arm movable away from the top of the conveyer rolls after the let-down bar raises the metal stock off of the arm.

3. A shear line assembly as defined in claim 2 further comprising a conveyer chain on the surface of the stock rack for feeding metal stock onto the feed table.

4. A shear line assembly for handling metal stock for shearing by a shear, the assembly including a feed table with metal stock feeding means positioned ahead of a shear, and an elongated discharge table aligned with the feed table on the opposite side of the shear from the feed table, the discharge table including stop means for stopping metal being fed past the shear to determine the length of metal cut by the shear, the improvements comprising; a front section of the discharge table nearest the shear being split along a horizontal plane transverse to the length of the table, pivots hinging the front section of the discharge table to the remainder of the discharge table about a horizontal axis transverse to the length of the table, means normally supporting the hinged front section of the discharge table level with the remainder of the discharge table but actuatable to drop the front hinged section of the discharge table about the horizontal axis at the time the shear cuts the metal stock so that the shock of the shear cutting the metal stock will not be transferred to the front hinged section of the discharge table.

5. A shear line assembly as defined in claim 4 further including a metal stock hold-down positioned above the hinged section of the discharge table and preventing the metal stock cut by the shear from jumping off the discharge table.

6. A shear line assembly for handling metal stock for shearing by a shear, the assembly including a feed table with metal stock feeding means positioned ahead of a shear, and an elongated discharge table aligned with the feed table on the opposite side of the shear from the feed table, the discharge table including stop means for stopping metal being fed past the shear to determine the length of metal cut by the shear, the improvements comprising; the stop means including a plurality of spaced gauges each having shock absorbers, means mounting each of the gauges for movement into and out of the path of movement of the metal stock along the top of the discharge table, the discharge table including a movable truck section and a tiltable conveyer section carrying the spaced gauges, a stationary rail on which the truck is longitudinally movable, and adjustment means for adjusting the longitudinal position of the movable discharge table an amount at least equal to the distance between spaced gauges.

7. A shear line assembly for handling metal stock for shearing by a shear, the assembly including a feed table with metal stock feeding means positioned ahead of a shear, and an elongated discharge table aligned with the feed table on the opposite side of the shear from the feed table, the discharge table including stop means for stopping metal being fed past the shear to determine the length of metal cut by the shear, the improvements comprising: the discharge table including a top conveyer section with driven conveyer rollers, the top conveyer section pivotally supported on a movable truck section, the pivot support extending along the longitudinal center of the discharge table in a horizontal plane, means including a power cylinder on each side of the pivot connected to the top conveyer section for tilting the conveyer section of the discharge table to discharge metal stock from the side of the discharge table, and an auxiliary discharge assisting mechanism pivoted to the conveyer section from one side thereof, and motor means acting between the discharge assistant mechanism and conveyer to extend one end of the discharge assistant arm above the level of conveyer rollers to provide a steeper incline for discharge of cut metal stock.

8. A shear line assembly for handling metal stock for shearing by a shear, the assembly including a feed table with metal stock feeding means positioned ahead of a shear, and an elongated discharge table aligned with the feed table on the opposite side of the shear from the feed table, the discharge table including stop means for stopping metal being fed past the shear to determine the length of metal cut by the shear, the improvements comprising: the discharge table including a top conveyer section with driven conveyer rollers, the top conveyer section pivotally supported on a movable truck section, the pivot support extending along the longitudinal center of the discharge table in a horizontal plane, means for tilting the conveyer section of the discharge table to discharge metal stock from the side of the discharge table, and an auxiliary discharge assisting mechanism pivoted to the conveyer section from one side thereof, and motor means acting between the discharge assistant mechanism and conveyer to extend one end of the discharge assistant arm above the level of conveyer rollers to provide a steeper incline for discharge of cut metal stock.

References Cited

UNITED STATES PATENTS

| | | | |
|---|---|---|---|
| 1,337,458 | 4/1920 | Lamb | 83—212 X |
| 2,397,192 | 3/1946 | Meyerbach. | |
| 2,740,474 | 4/1956 | Harrison. | |
| 2,781,573 | 2/1957 | Espari et al. | |
| 2,793,662 | 5/1957 | Oholm | 83—467 X |
| 2,815,074 | 12/1957 | Dehn. | |
| 2,933,966 | 4/1960 | Dehn. | |
| 2,979,186 | 4/1961 | Sehn et al. | |
| 3,045,519 | 7/1962 | Sarka. | |
| 3,072,267 | 1/1963 | Gasparetti et al. | 214—1 |
| 3,155,242 | 11/1964 | Magloire | 83—269 |
| 3,244,047 | 4/1966 | Daniluk. | |
| 3,245,299 | 4/1966 | Klusmier et al. | |
| 3,304,824 | 2/1967 | Hess et al. | |

ANDREW R. JUHASZ, *Primary Examiner*.